US008937248B2

(12) United States Patent
Huang

(10) Patent No.: US 8,937,248 B2
(45) Date of Patent: Jan. 20, 2015

(54) EARPHONE CABLE STRUCTURE

(71) Applicant: Jetvox Acoustic Corp., Taoyuan County (TW)

(72) Inventor: To-Teng Huang, Taoyuan County (TW)

(73) Assignee: Jetvox Acoustic Corp., Taoyuan, Taoyuan County (TW)

( * ) Notice: Subject to any disclaimer, the term of this patent is extended or adjusted under 35 U.S.C. 154(b) by 206 days.

(21) Appl. No.: 13/743,871

(22) Filed: Jan. 17, 2013

(65) Prior Publication Data

US 2014/0138150 A1 May 22, 2014

(30) Foreign Application Priority Data

Nov. 21, 2012 (TW) ............................ 101222581 A

(51) Int. Cl.

| | |
|---|---|
| ***H01B 7/00*** | (2006.01) |
| ***H02G 3/00*** | (2006.01) |
| ***H02G 3/04*** | (2006.01) |
| ***H04R 25/00*** | (2006.01) |
| ***H01B 11/00*** | (2006.01) |
| ***H04R 1/10*** | (2006.01) |
| ***H04R 5/033*** | (2006.01) |

(52) U.S. Cl.
CPC .............. *H01B 11/00* (2013.01); *H04R 1/1033* (2013.01); *H04R 5/033* (2013.01)
USPC ...... 174/71 R; 174/70 R; 174/96; 174/113 R; 174/114 R; 384/370; 384/384

(58) Field of Classification Search
USPC ................ 174/70 R, 71 R, 96, 113 R, 114 R; 381/370, 384
See application file for complete search history.

(56) References Cited

U.S. PATENT DOCUMENTS

| | | | | |
|---|---|---|---|---|
| 5,304,741 | A | 4/1994 | Proulx | |
| 8,068,633 | B2 * | 11/2011 | Lee et al. | 381/384 |
| 2006/0285715 | A1 | 12/2006 | Drambarean et al. | |
| 2009/0169044 | A1 * | 7/2009 | Kashiwagi et al. | 381/384 |
| 2009/0238395 | A1 * | 9/2009 | Jubelirer et al. | 381/370 |
| 2009/0245549 | A1 * | 10/2009 | Jubelirer et al. | 381/309 |
| 2010/0027831 | A1 | 2/2010 | Lee et al. | |
| 2010/0054493 | A1 * | 3/2010 | Lin et al. | 381/74 |
| 2011/0158455 | A1 * | 6/2011 | Kim et al. | 381/370 |
| 2012/0076318 | A1 * | 3/2012 | Aase et al. | 381/74 |

FOREIGN PATENT DOCUMENTS

| | | | |
|---|---|---|---|
| DE | 102007042067 | A1 | 3/2009 |
| EP | 1509062 | A1 | 2/2005 |

* cited by examiner

*Primary Examiner* — Timothy Thompson
*Assistant Examiner* — Sherman Ng
(74) *Attorney, Agent, or Firm* — Muncy, Geissler, Olds & Lowe, P.C.

(57) ABSTRACT

An earphone cable structure includes a first connection sleeve, a primary cable, a first branch cable, a second branch cable and a thin-type bridging section. The first connection sleeve includes a first end and a second end. The primary cable is connected to the first end, and includes first core lines and second core lines. The first branch cable is connected to the second end, and includes third core lines connected to the first core lines. The second branch cable is connected to the second end, and includes fourth core lines connected to the second core lines. The axial cross-sectional width of the primary cable is equal to the axial cross-sectional width of the first branch cable plus that of the second branch cable. The thin-type bridging section is connected between the first branch cable and the second branch cable.

10 Claims, 7 Drawing Sheets

EARPHONE CABLE STRUCTURE

CROSS-REFERENCES TO RELATED APPLICATIONS

This non-provisional application claims priority under 35 U.S.C. §119(a) on Patent Application No. 101222581 filed in Taiwan, R.O.C. on Nov. 21, 2012, the entire contents of which are hereby incorporated by reference.

BACKGROUND OF THE INVENTION

1. Technical Field

The present invention relates to a cable structure, and more particularly to an earphone cable structure.

2. Related Art

Currently, earphone cables are applied to many electronic products. For example, the earphone cables are used for answering an incoming call on a mobile phone, or are used for listening to a song on devices such as an ordinary music playing device.

The cables of an ordinary earphone are provided with a connection block (namely, controller), having a separation function. The cables at the upper side and the lower side of the connection block are formed into three transmission lines, namely, one primary line for connecting a plug end, and two branch lines for connecting earphone ends. However, the entire cross-sectional width of the primary line is generally larger than the cross-sectional width of the two branch lines, so that the total weight of the cables is high and the impedance is low. Furthermore, the two branch lines are machined and manufactured into two independent branch lines respectively, so that it is impossible to manufacture two connected branch lines through a machining process once for all to simplify the machining process.

Therefore, how to reduce the total weight of the earphone cables, increase the impedance, and meanwhile simplify the machining process is one of the problems to be solved urgently.

SUMMARY

In view of the above problems, the present invention provides an earphone cable structure, so as to solve the problems in the prior art that the earphone cables have large total weight and low impedance.

An embodiment of the present invention provides an earphone cable structure including a first connection sleeve, a primary cable, a first branch cable, a second branch cable and a thin-type bridging section. The first connection sleeve includes a first end and a second end. The primary cable is connected to the first end of the first connection sleeve, and includes a plurality of first core lines and a plurality of second core lines. The first branch cable is connected to the second end of the first connection sleeve, and includes a plurality of third core lines connected to the plurality of first core lines. The second branch cable is connected to the second end of the first connection sleeve, and includes a plurality of fourth core lines connected to the plurality of second core lines. The axial cross-sectional width of the primary cable is equal to the axial cross-sectional width of the first branch cable plus that of the second branch cable. The thin-type bridging section is connected between the first branch cable and the second branch cable, and is disassembled to separate the first branch cable and the second branch cable.

In the present invention, the axial cross-sectional width of the primary cable is equal to the axial cross-sectional width of the first branch cable plus that of the second branch cable, and the thin-type bridging section is conveniently disassembled to separate the first branch cable and the second branch cable, thereby providing effects of reducing the total weight of the earphone cable structure, increasing the impedance, and simplifying the machining process under the premise of ensuring that the internal core lines are protected by the insulating sheath.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
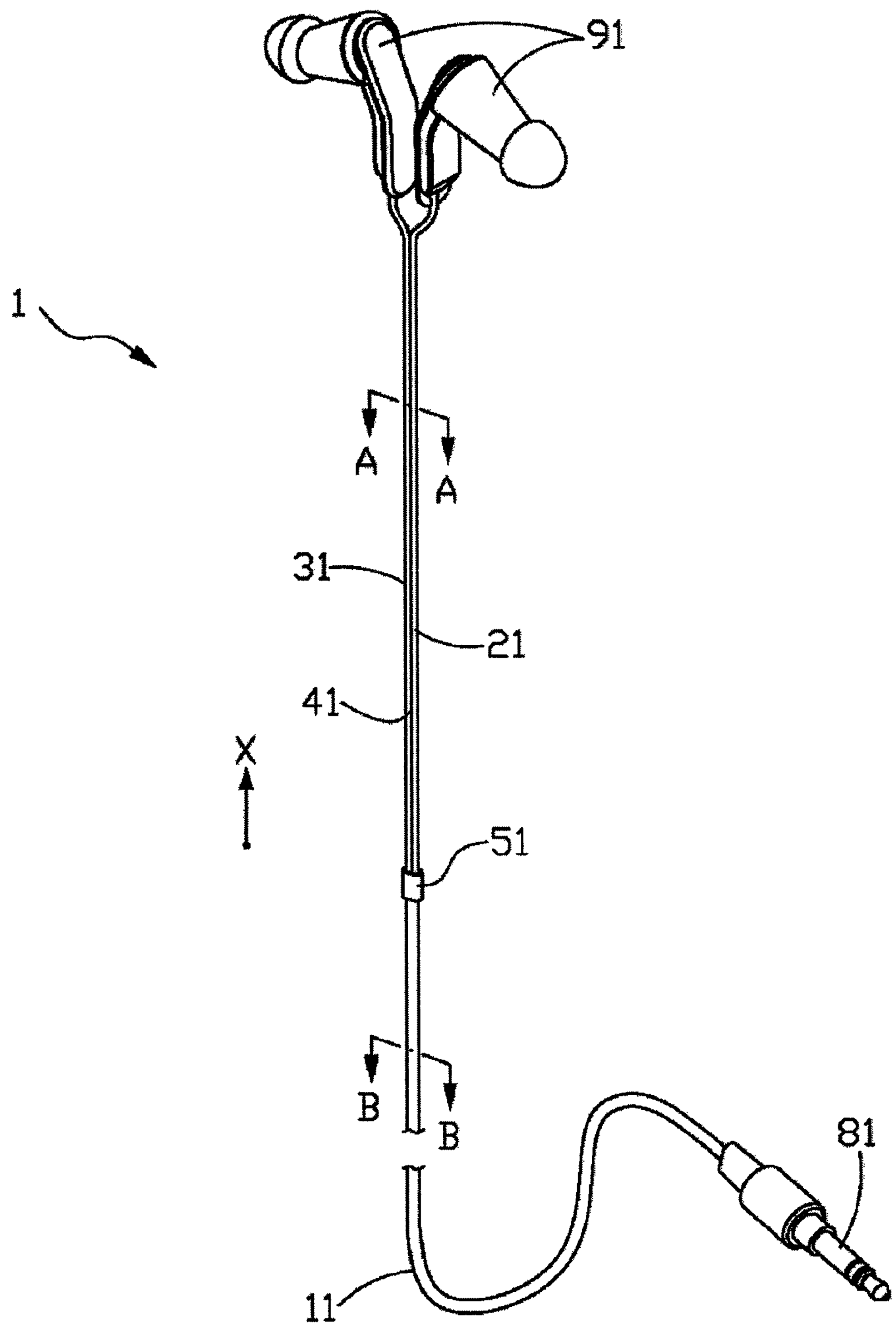
FIG. 1 is a schematic outside view of a first embodiment of the present invention.
Figure 2A:
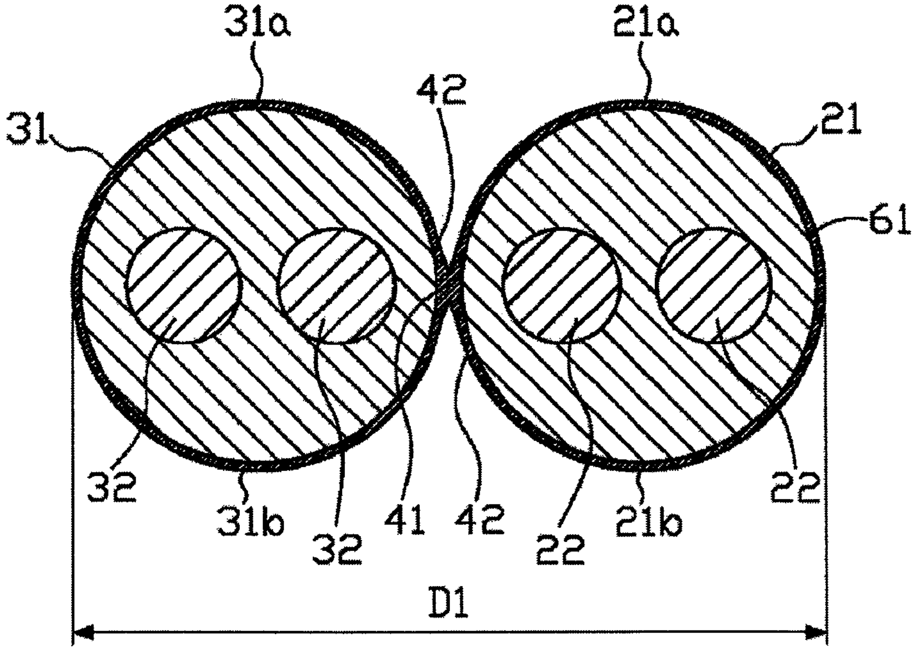
FIG. 2A is a schematic cross-sectional view of the cross-section A-A in FIG. 1.
Figure 3:
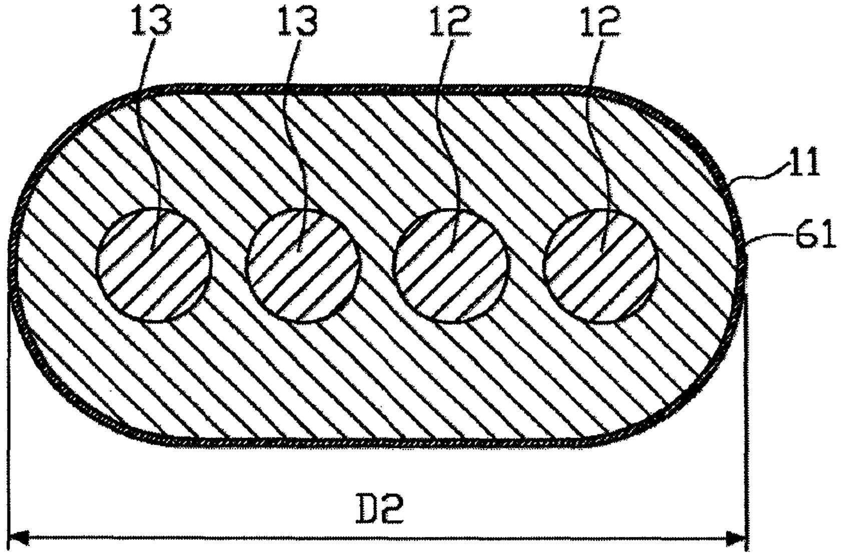
FIG. 3 is a schematic cross-sectional view of the cross-section B-B in FIG. 1.

FIG. 1 is a schematic outside view of earphone cables according to a first embodiment of the present invention. FIG. 2A is a schematic cross-sectional view of the cross-section A-A in FIG. 1. FIG. 3 is a schematic cross-sectional view of the cross-section B-B in FIG. 1.

As shown in FIG. 1, FIG. 2A and FIG. 3, an earphone cable structure 1 includes a first connection sleeve 51, a primary cable 11, a first branch cable 21, a second branch cable 31 and a thin-type bridging section 41.

Figure 4:
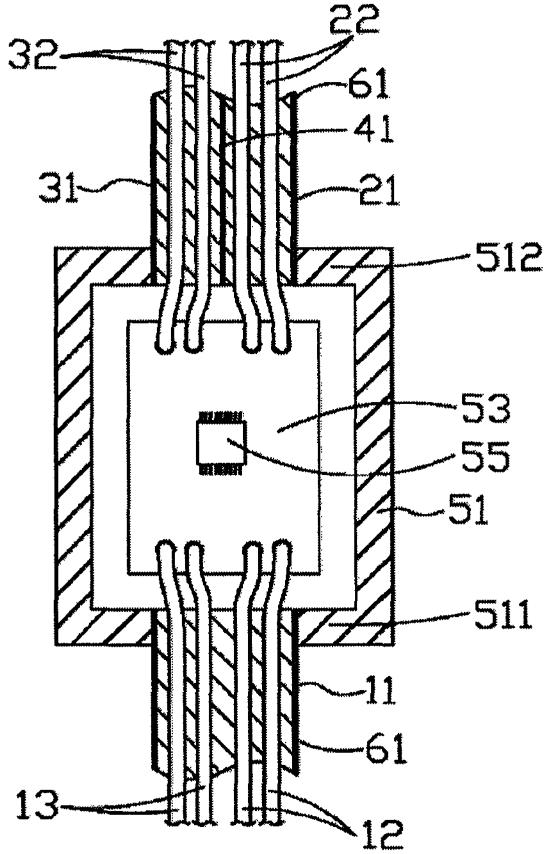
FIG. 4 is a schematic enlarged view of a cross-section of a first connection sleeve in the present invention.

Please refer to FIG. 1 and FIG. 4, in which the first connection sleeve 51 includes a first end 511 and a second end 512. The first connection sleeve 51 is located between the primary cable 11 and the first branch cable 21 as well as the second branch cable 31, and is made of a plastic material. Here, the cross-sectional width of the first connection sleeve 51 in the direction of the axis X is greater than the cross-sectional width of the primary cable 11 in the direction of the axis X. In this embodiment, the first connection sleeve 51 further includes a first circuit board 53, a control chip 55 is provided on the first circuit board 53, a plurality of first core lines 12 and a plurality of third core lines 22 are connected to the upper side and the lower side of the first circuit board 53 in a welding manner, and the plurality of first core lines 12 and the plurality of third core lines 22 are connected through the first circuit board 53 and are electrically conducted. Furthermore, a plurality of second core lines 13 and a plurality of fourth core lines 32 are connected to the upper side and the lower side of the first circuit board 53 in a welding manner, and the plurality of second core lines 13 and the plurality of fourth core lines 32 are connected through the first circuit board 53 and are electrically conducted. In some embodiments, the first connection sleeve 51 includes a control button (not shown), so as to provide operational functions such as control of the sound volume and switching of the song or answering mode.

Figure 8:
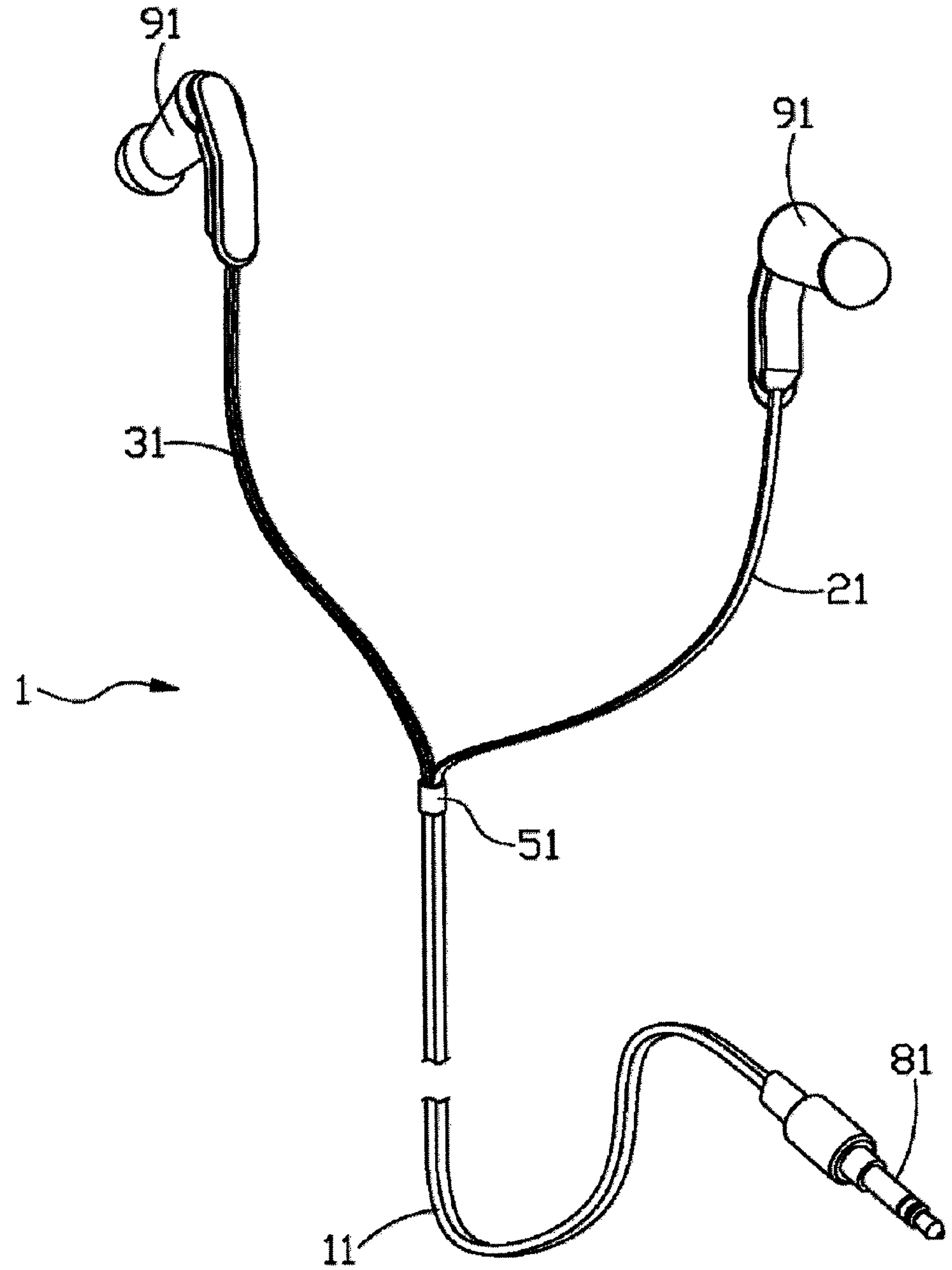
FIG. 8 is a schematic outside view of a flat wire aspect in the present invention.

Please refer to FIG. 3, in which the primary cable 11 is connected to the first end 511 of the first connection sleeve 51 and is mainly formed of the plurality of first core lines 12 and the plurality of second core lines 13, and the plurality of first core lines 12 and the plurality of second core lines 13 are formed into transmission lines made of a copper material. Here, the primary cable 11 includes an insulating sheath 61 to wrap the plurality of first core lines 12 and the plurality of second core lines 13, that is to say, the insulating sheath 61 is located at an edge of the first connection sleeve 51 (as shown in FIG. 4), while the plurality of first core lines 12 and the plurality of second core lines 13 extend into the first connection sleeve 51, but the present invention is not limited thereto, and the insulating sheath 61 may also extend into the first connection sleeve 51. Moreover, in this embodiment, the primary cable 11 is of a round cross-section (namely, formed into a round transmission line); however, Please refer to FIG. 8, in which in some implementation aspects, the primary cable 11 may have a rectangular cross-section (namely, formed into a flat transmission line).

Please refer to FIG. 1, FIG. 2A, and FIG. 3, in which the first branch cable 21 is connected to the second end 512 of the first connection sleeve 51 and is mainly formed of the plurality of third core lines 22, and the plurality of third core lines 22 is formed into transmission lines made of a copper material. Here, the plurality of third core lines 22 extends into the first connection sleeve 51 and is electrically connected to the plurality of first core lines 12. Additionally, the first branch cable 21 is provided with a first surface 21*a* and a second surface 21*b*. In this embodiment, the plurality of first core lines 12 and the plurality of third core lines 22 are left sound track leads and ground wires. Moreover, the first branch cable 21 includes the insulating sheath 61 to wrap the plurality of third core lines 22. The insulating sheath 61 is located at an edge of the first connection sleeve 51 (as shown in FIG. 4), while the plurality of third core lines 22 extends into the first connection sleeve 51, but the present invention is not limited thereto, and the insulating sheath 61 may also extend into the first connection sleeve 51.

Please refer to FIG. 1, FIG. 2A, and FIG. 3, in which the second branch cable 31 is connected to the second end 512 of the first connection sleeve 51 and is mainly formed of the plurality of fourth core lines 32, and the plurality of fourth core lines 32 is formed into transmission lines made of a copper material. Here, the plurality of fourth core lines 32 extends into the first connection sleeve 51 and is electrically connected to the plurality of second core lines 13. Additionally, the second branch cable 31 is provided with a first surface 31*a* and a second surface 31*b*. In this embodiment, the plurality of second core lines 13 and the plurality of fourth core lines 32 are right sound track leads and ground wires.

In this embodiment, the plurality of first core lines 12 and the plurality of third core lines 22 have the same cross-sectional width, and the plurality of second core lines 13 and the plurality of fourth core lines 32 have the same cross-sectional width.

In this embodiment, please refer to FIG. 1, FIG. 2A and FIG. 3, in which the total cross-sectional width D1 of the first branch cable 21 and the second branch cable 31 in the direction of the axis X in FIG. 2A is equal to the cross-sectional width D2 of the primary cable 11 in the direction of the axis X in FIG. 3, that is to say, the entire width of the first branch cable 21 is one half of the entire width of the primary cable 11, and the entire width of the second branch cable 31 is one half of the entire width of the primary cable 11. For example, one primary cable 11 of 3.0 mm may be divided into one first branch cable 21 of 1.5 mm and one second branch cable 31 of 1.5 mm. Here, the second branch cable 31 includes the insulating sheath 61 to wrap the plurality of fourth core lines 32. The insulating sheath 61 is located at an edge of the first connection sleeve 51 (as shown in FIG. 4), while the plurality of fourth core lines 32 extends into the first connection sleeve 51, but the present invention is not limited thereto, and the insulating sheath 61 may also extend into the first connection sleeve 51. In this embodiment, one primary cable 11 is formed to connect a plug end 81, and one first branch cable 21 and one second branch cable 31 are formed to connect earphone ends 91.

Figure 7:
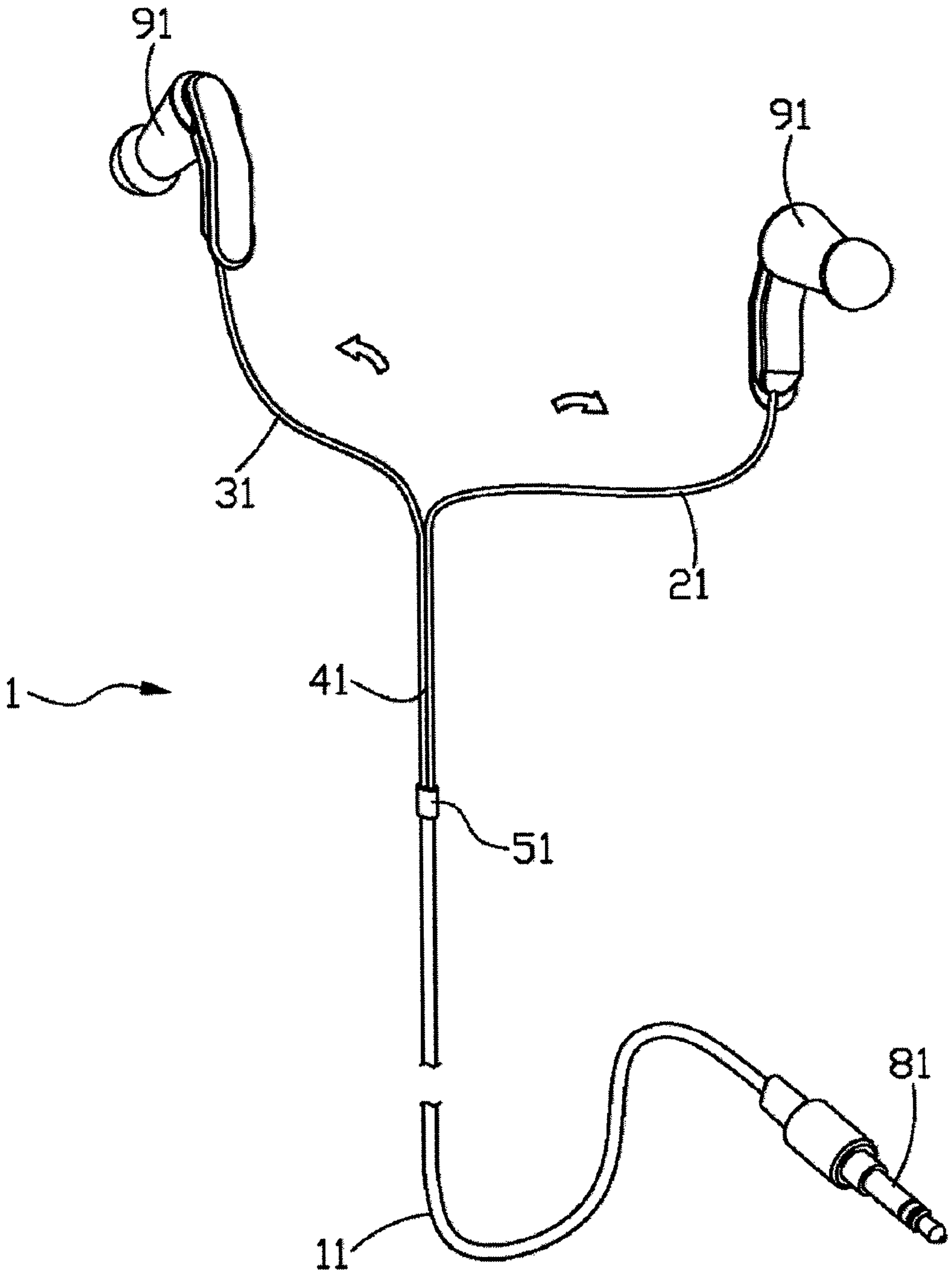
FIG. 7 is a schematic outside view of the first embodiment of the present invention in use.

Please refer to FIG. 2A and FIG. 7, in which the thin-type bridging section 41 is connected between the first branch cable 21 and the second branch cable 31, and when a user pulls the first branch cable 21 and the second branch cable 31 apart in opposite directions, the thin-type bridging section 41 may be disassembled to separate the first branch cable 21 and the second branch cable 31. In this embodiment, the thin-type bridging section 41 includes a plurality of grooves 42 located on the first surface 21*a*/31*a* and the second surface 21*b*/31*b* between the first branch cable 21 and the second branch cable 31 (namely, the upper surface and the lower surface of the first branch cable 21 and the second branch cable 31 in FIG. 2A).

Figure 2B:
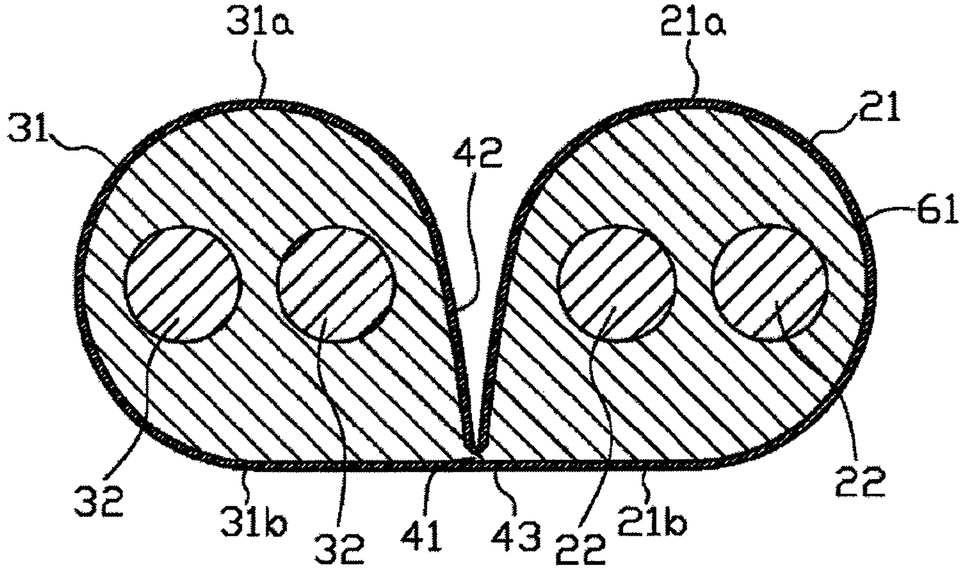
FIG. 2B is a schematic cross-sectional view of another aspect of the cross-section A-A in FIG. 1.

The foregoing illustration about that the thin-type bridging section 41 includes a plurality of grooves 42 located on the first surface 21*a*/31*a* and the second surface 21*b*/31*b* between the first branch cable 21 and the second branch cable 31 is only exemplary. In some implementation aspects, the grooves 42 may also be located on a surface between the first branch cable 21 and the second branch cable 31, and please refer to FIG. 2B, in which the grooves 42 are located on the first surface 21*a*/31*a* between the first branch cable 21 and the second branch cable 31. However, in some embodiments, the grooves 42 may also be located on the second surface 21*b*/31*b* (not shown), between the first branch cable 21 and the second branch cable 31, and another surface between the first branch cable 21 and the second branch cable 31 may be a flat surface 43.

Here, the thin-type bridging section 41 is formed of the insulating sheath 61. In this embodiment, when the primary cable 11, the first branch cable 21 and the second branch cable 31 are attached to the insulating sheath 61 after machining, the thin-type bridging section 41 is directly formed between the first branch cable 21 and the second branch cable 31. However, in some embodiments, the thin-type bridging section 41 may also be connected between the first branch cable 21 and the second branch cable 31 through other structures, and the present invention is not limited thereto.

Figure 5:
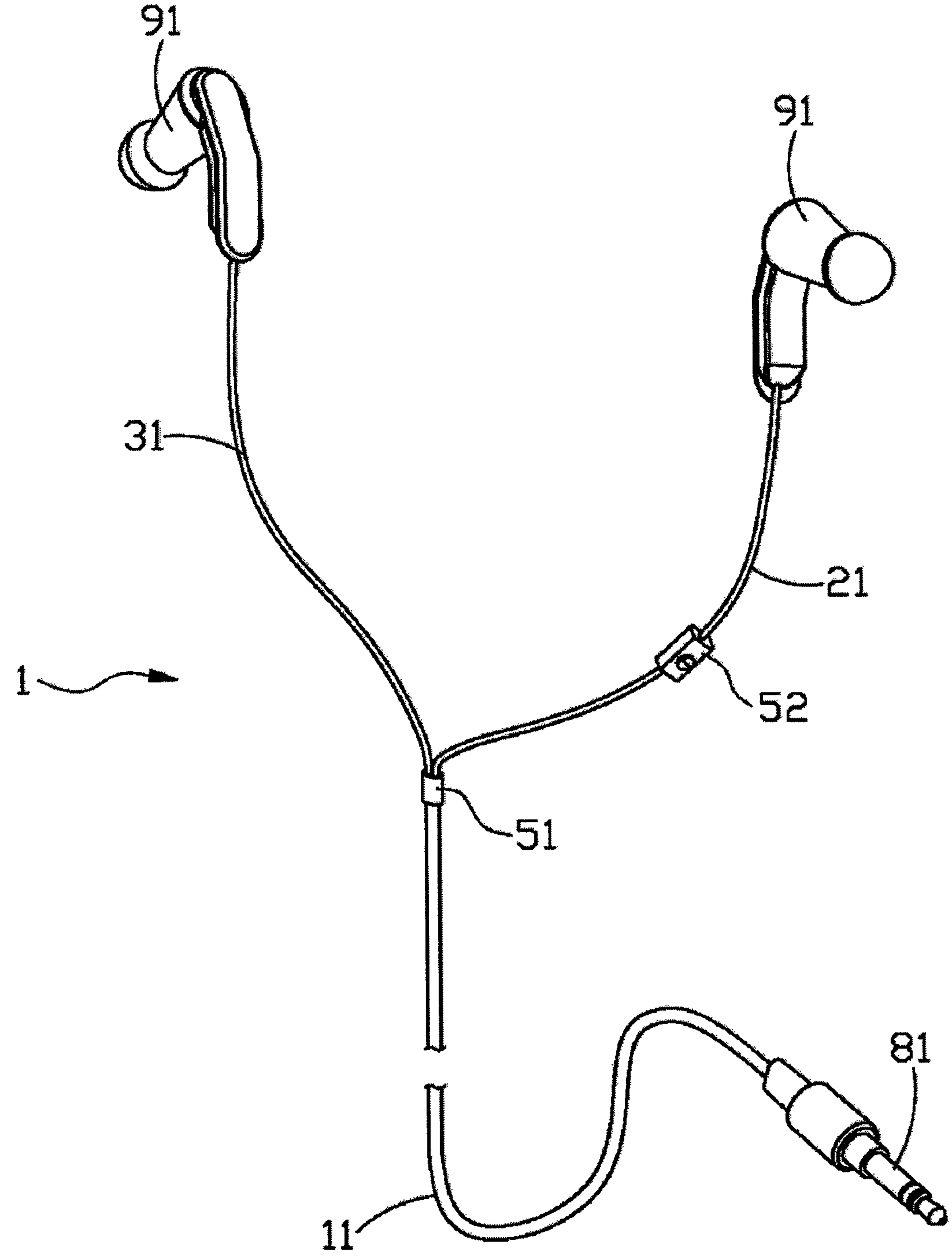
FIG. 5 is a schematic outside view of a second connection sleeve in the present invention.
Figure 6:
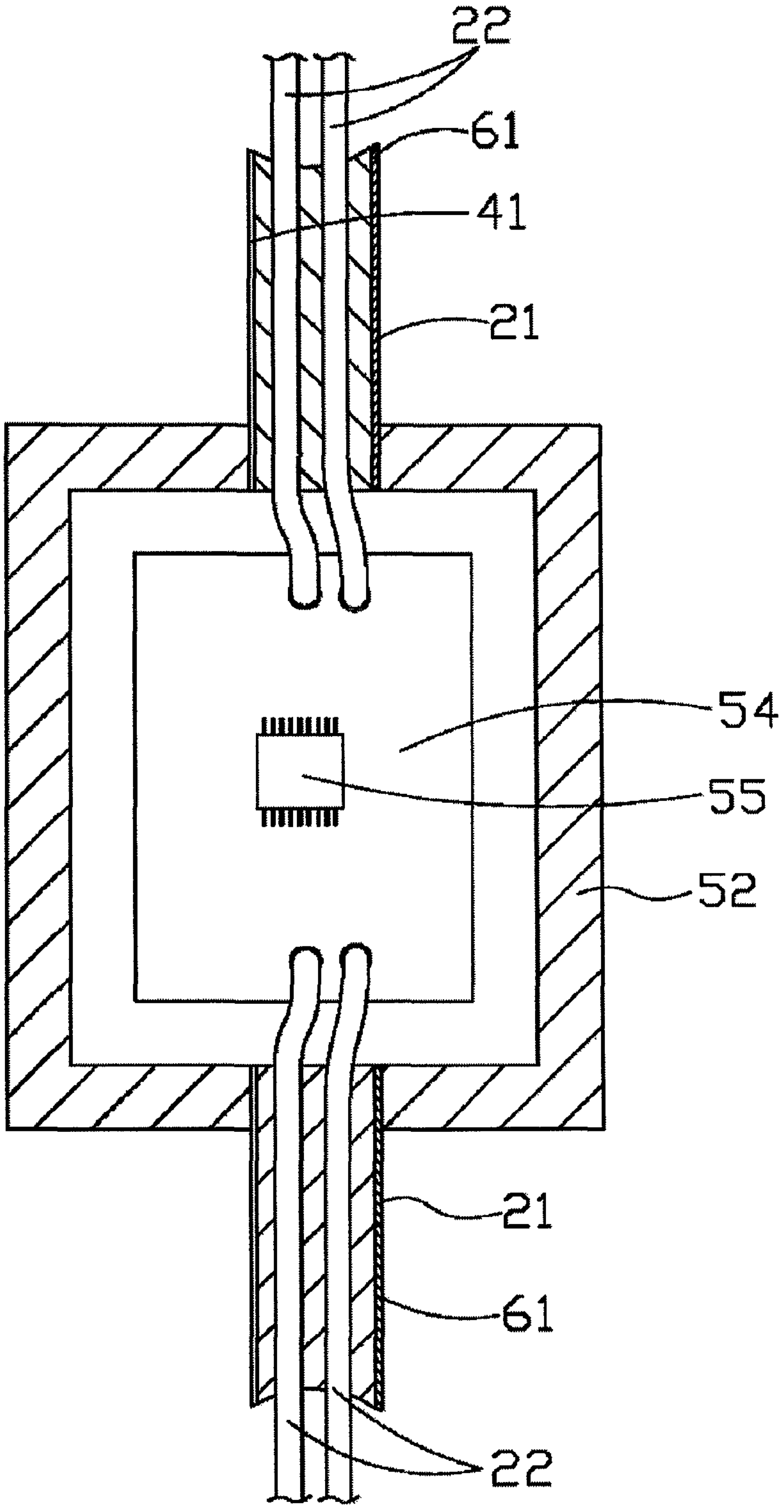
FIG. 6 is a schematic cross-sectional view of the second connection sleeve in the present invention.

In some embodiments, please refer to FIG. 5 and FIG. 6, in which the earphone cable structure 1 further includes a second connection sleeve 52, and the second connection sleeve 52 is made of a plastic material. Here, the second connection sleeve 52 is located on the first branch cable 21. However, in some embodiments, the second connection sleeve 52 may be located on the second branch cable 31, and the present invention is not limited thereto. In some embodiments, the second connection sleeve 52 may include a second circuit board 54 (such as the foregoing first circuit board 53), and a control chip 55 is provided on the second circuit board 54. When the second connection sleeve 54 is disposed on the first branch cable 21, the plurality of third core lines 22 is divided into two segments connected to the upper side and the lower side of the second circuit board 54. In some embodiments, the second connection sleeve 52 includes a control button described above, and here, the control button provides operational functions such as control and switching of the song or answering mode.

In the present invention, the axial cross-sectional width of the primary cable is equal to the axial cross-sectional width of the first branch cable plus that of the second branch cable, and the thin-type bridging section is conveniently disassembled to separate the first branch cable and the second branch cable, thereby providing effects of reducing the total weight of the earphone cable structure, increasing the impedance, and simplifying the machining process under the premise of ensuring that the internal core lines are protected by the insulating sheath.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An earphone cable structure, comprising:

a first connection sleeve, comprising a first end and a second end;

a primary cable, connected to the first end of the first connection sleeve, and comprising a plurality of first core lines and a plurality of second core lines, wherein the first core lines and the second core lines extend into the first connection sleeve;

a first branch cable, connected to the second end of the first connection sleeve, and comprising a plurality of third core lines extending into the first connection sleeve and electrically connected to the first core lines;

a second branch cable, connected to the second end of the first connection sleeve, and comprising a plurality of fourth core lines extending into the first connection sleeve and electrically connected to the second core lines, wherein the axial cross-sectional width of the primary cable is equal to the axial cross-sectional width of the first branch cable plus that of the second branch cable; and a thin-type bridging section, connected between the first branch cable and the second branch cable.

2. The earphone cable structure according to claim 1, wherein the first connection sleeve further comprises a first circuit board, the first core lines and the third core lines are connected to the first circuit board and are electrically conducted, and the second core lines and the fourth core lines are connected to the first circuit board and are electrically conducted.

3. The earphone cable structure according to claim 1, further comprising a second connection sleeve, located on the first branch cable or the second branch cable.

4. The earphone cable structure according to claim 3, wherein the second connection sleeve further comprises a second circuit board.

5. The earphone cable structure according to claim 1, wherein the thin-type bridging section comprises a groove located on a surface between the first branch cable and the second branch cable.

6. The earphone cable structure according to claim 1, wherein the thin-type bridging section further comprises a flat surface located on a surface between the first branch cable and the second branch cable.

7. The earphone cable structure according to claim 1, wherein the axial cross-sectional width of the first connection sleeve is greater than the axial cross-sectional width of the primary cable.

8. The earphone cable structure according to claim 1, wherein the first core lines and the third core lines are a left sound track lead and a ground wire, and the second core lines and the fourth core lines are a right sound track lead and a ground wire.

9. The earphone cable structure according to claim 1, further comprising an insulating sheath for wrapping the first core lines, the second core lines, the third core lines and the fourth core lines.

10. The earphone cable structure according to claim 1, wherein the insulating sheath forms the thin-type bridging section.

* * * * *